J. T. RAMSDEN.
MOLDER'S CLAMP.
APPLICATION FILED JULY 22, 1910.
971,687.
Patented Oct. 4, 1910.
2 SHEETS—SHEET 1.
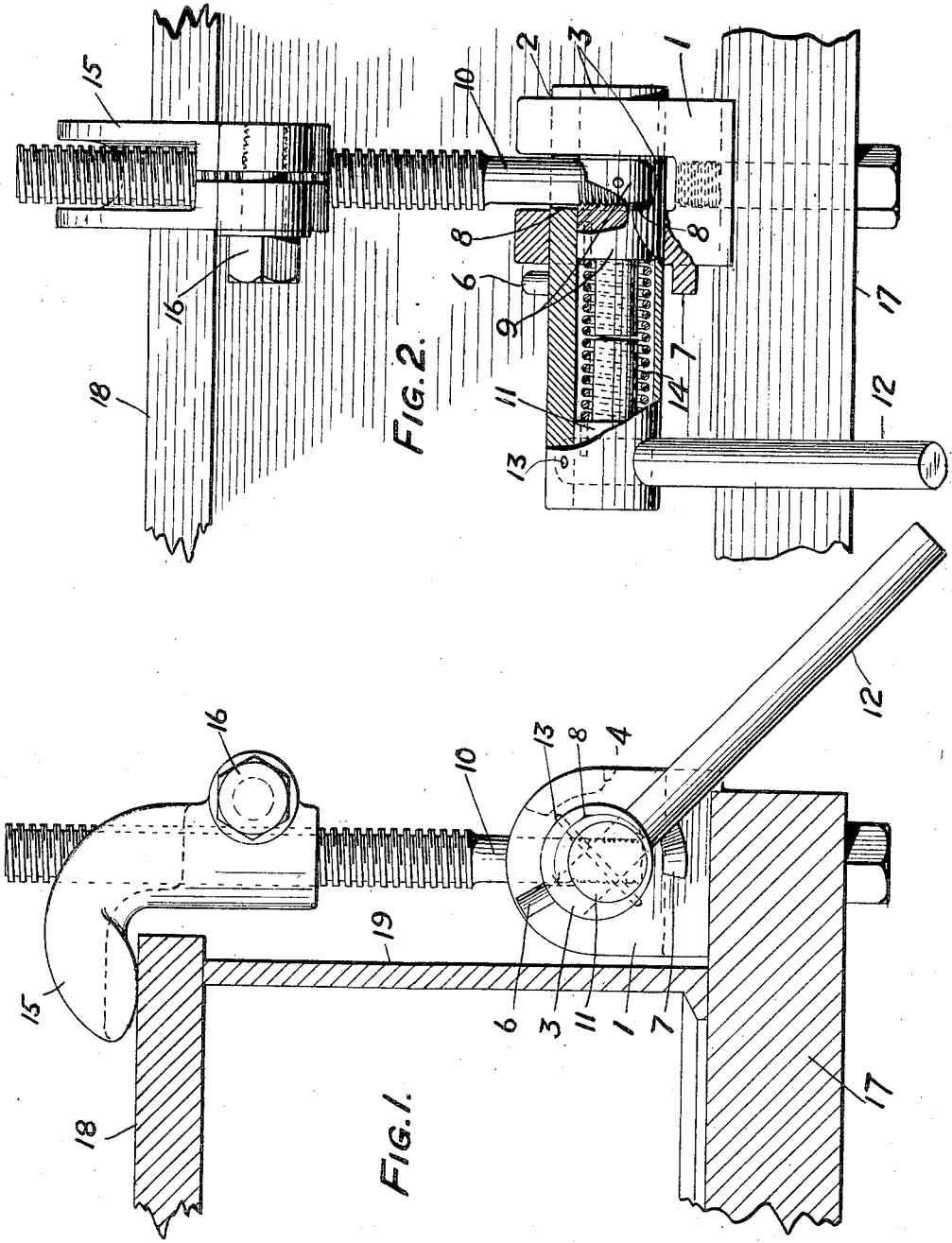
WITNESSES:
INVENTOR
John T. Ramsden
BY
Augustus B. Stoughton.
ATTORNEY.

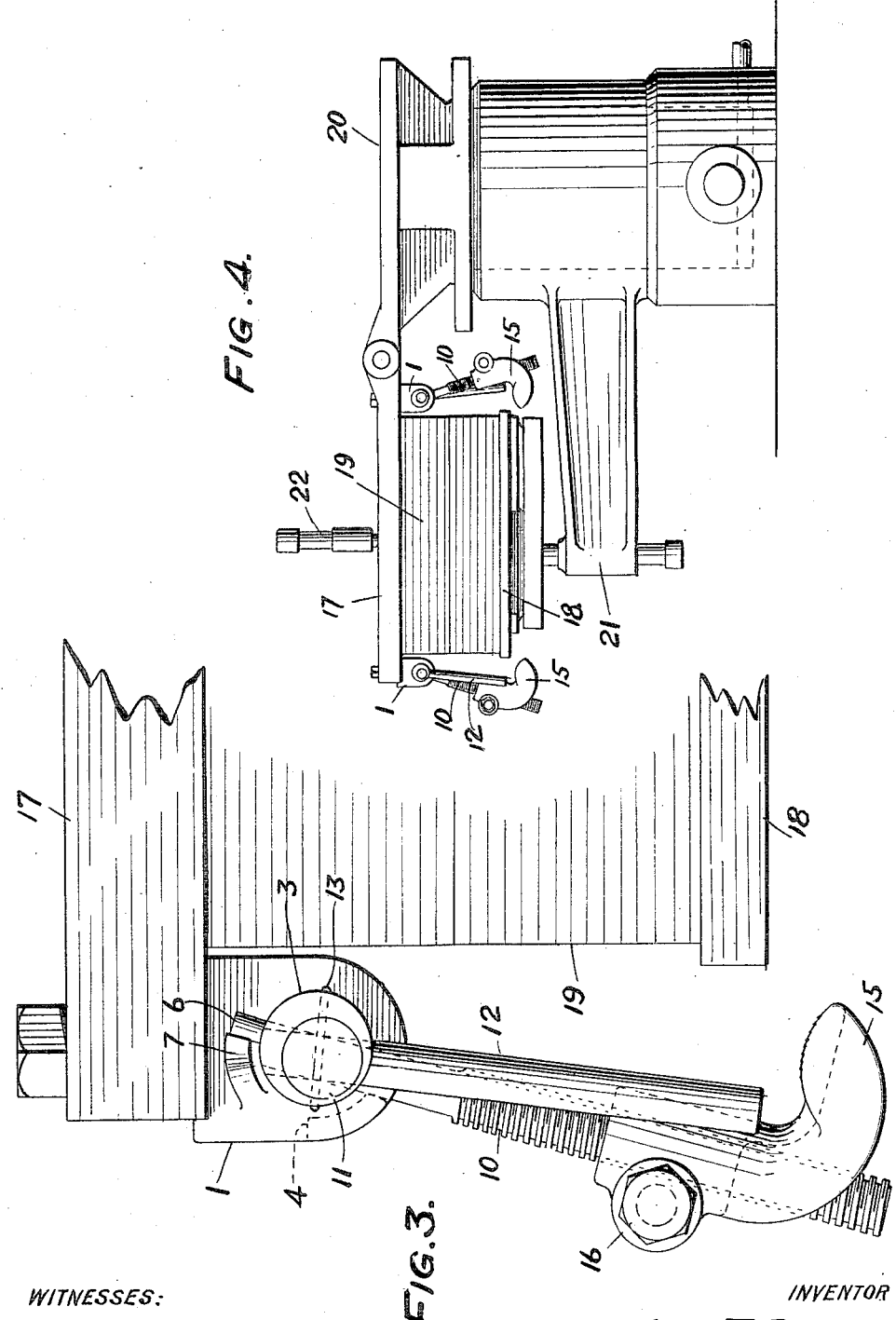

UNITED STATES PATENT OFFICE.

JOHN T. RAMSDEN, OF PHILADELPHIA, PENNSYLVANIA, ASSIGNOR TO THE TABOR MANUFACTURING COMPANY, OF PHILADELPHIA, PENNSYLVANIA, A CORPORATION OF NEW JERSEY.

MOLDER'S CLAMP.

971,687.   Specification of Letters Patent.   Patented Oct. 4, 1910.

Application filed July 22, 1910.  Serial No. 573,176.

*To all whom it may concern:*

Be it known that I, JOHN T. RAMSDEN, a citizen of the United States, residing at the city of Philadelphia, in the county of Philadelphia and State of Pennsylvania, have invented a certain new and useful Molder's Clamp, of which the following is a specification.

The principal object of the present invention is to provide a molder's clamp especially adapted for use in connection with roll-over machines but useful in other connections and which automatically releases itself and which is easy of manipulation and is strong, durable and reliable.

The invention will be claimed at the end hereof but will first be described in connection with the embodiment but not the only embodiment, of it chosen for illustration in the accompanying drawings in which—

Figure 1, is a side view illustrating a clamp embodying features of the invention. Fig. 2, is a front view with parts broken away of the same. Fig. 3, is a side view illustrating a different position of the clamp, and Fig. 4, is a side view illustrating the clamp in application to a roll-over machine.

In the drawings 1, is a stand having a bearing 2, for a sleeve 3. As shown this stand comprises two ears having a slot between them and the slot does not extend all the way between the ears but is interrupted by a part 4, which constitutes a stop hereinafter described. An operating sleeve 3, is revolubly mounted in the stand and it is provided with a projection 6, that coöperates with the stop 7, on the stand. The bore of the sleeve is eccentrically disposed and extends clear through the sleeve. The sleeve is provided with a peripheral slot 8, that extends partway around its circumference. Within the bore of the sleeve is mounted an arbor 9, and it is provided with a radial opening in which is mounted the shank 10, of the clamping jaw, and this shank 10, is arranged to move in the slot of the stand and in the peripheral slot 8, of the sleeve. Within the bore of the sleeve is also mounted a stud 11. The stud 11, and the sleeve constitute in effect one piece and are held together by the shank of the operating handle 12, which is pinned to them both by means of a pin 13. 14, is a spiral spring one end of which is connected with the stud 11, and the other end of which is connected with the arbor 9. The spring is coiled around appropriate portions of these parts and is under tension so that it tends to swing the shank 10, against the stop 4, and the stop 6, of the sleeve against the stop 7, of the stand. It may be stated that the shank 10, is shown as screwed into a suitable opening in the arbor and there pinned to place. The clamping jaw 15, is shown as provided with a split threaded opening and screwed onto the threaded portion of the shank 10, and with a clamping screw 16, by means of which it can be loosened and screwed on the shank so as to adjust it and then clamped to place.

The operation of the clamp will be described in connection with a roll-over molding machine although it may be used in whole or in part in connection with other types of machines.

The stand 1, is connected with the hinge member 17, of the molding machine and the clamping jaw is appropriately adjusted to reach over the bottom board 18, which is arranged on the flask 19. The jaw is swung over the bottom board and the operating handle 12, is turned down into the position shown in Fig. 1, with the result that the turning of the sleeve 3, causes its eccentric bore to shift the arbor 9, and with it the clamping jaw downward, thus binding the board 18, onto the flask. The friction of the parts serves to hold them aginst the tendency of the spring in the position described. It will now be assumed that the hinge member or flask carrier 17, has been turned over into the position shown in Fig. 4, ready to draw the pattern which is carried by the part 17, when the head 20, rises, leaving the flask and board 18, upon the support 21. Prior to the commencement of this operation the vibrator 22, is brought into action and by its vibration the friction which theretofore opposed the tendency of the spring 14, to turn the handle and shank 10, into contact with their stops, is overcome, so that the clamps and handles automatically assume the position shown in Fig. 4, with the result that the flask 19, is detached from the member 17, so that the latter may rise and draw the patterns.

What I claim is:

1. A molder's clamp comprising the combination of a stand having a slot, an operating sleeve revoluble in the stand and having an eccentric bore and a peripheral slot, an arbor mounted in the eccentric bore and provided with a radially arranged clamping jaw shank disposed in said slots, a spring arranged in the sleeve and interposed between it and the shank, and stops for the shank and sleeve, substantially as described.

2. A molder's clamp comprising the combination of a stand, a spring retracted jaw having a limited range of swinging movement in respect to the stand, a spring retracted operating lever having a limited range of turning motion in respect to the stand, and an eccentric interposed between the jaw and operating lever, substantially as described.

3. A molder's clamp comprising the combination of a stand having a slot, an operating sleeve revoluble in the stand and having an eccentric bore and a peripheral slot, an arbor mounted in the eccentric bore and provided with a radially arranged clamping jaw shank disposed in said slots, a stud fast in said sleeve, a handle projecting from said sleeve, a spring encircling parts of the arbor and stud and having its ends respectively connected with each, and stops for the shank and handle, substantially as described.

4. In combination a flask carrier provided with a pattern, a flask support, means for moving said carrier to draw the pattern, a flask, a vibrator, clamps consisting of a stand secured to said carrier, a spring retracted jaw having a limited range of swinging movement in respect to the stand, a spring retracted operating lever having a limited range of turning motion in respect to the stand, and an eccentric interposed between the jaw and operating lever, whereby the action of the vibrator overcomes the friction of the parts of the clamp and automatically releases the jaws, substantially as described.

5. In combination in a molder's clamp a threaded shank, a jaw having a split threaded opening and a screw for binding said opening onto and freeing it from the threaded shank, a stand, and means including an eccentric interposed between the stand and threaded shank for operating the jaw, substantially as described.

In testimony whereof I have hereunto signed my name.

JOHN T. RAMSDEN.

Witnesses:
S. E. PATTERSON,
K. M. GILLIGAN.